UNITED STATES PATENT OFFICE.

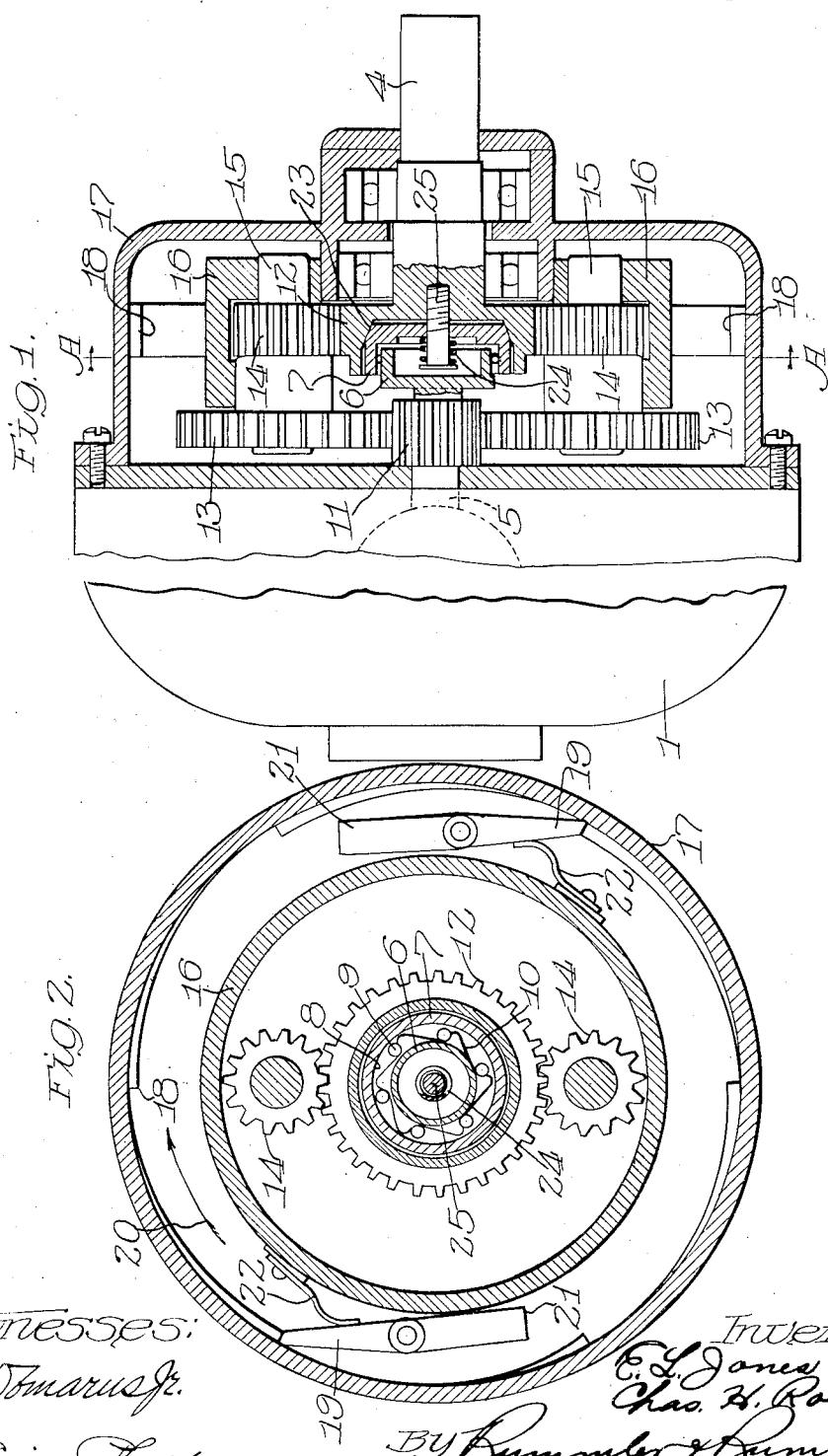

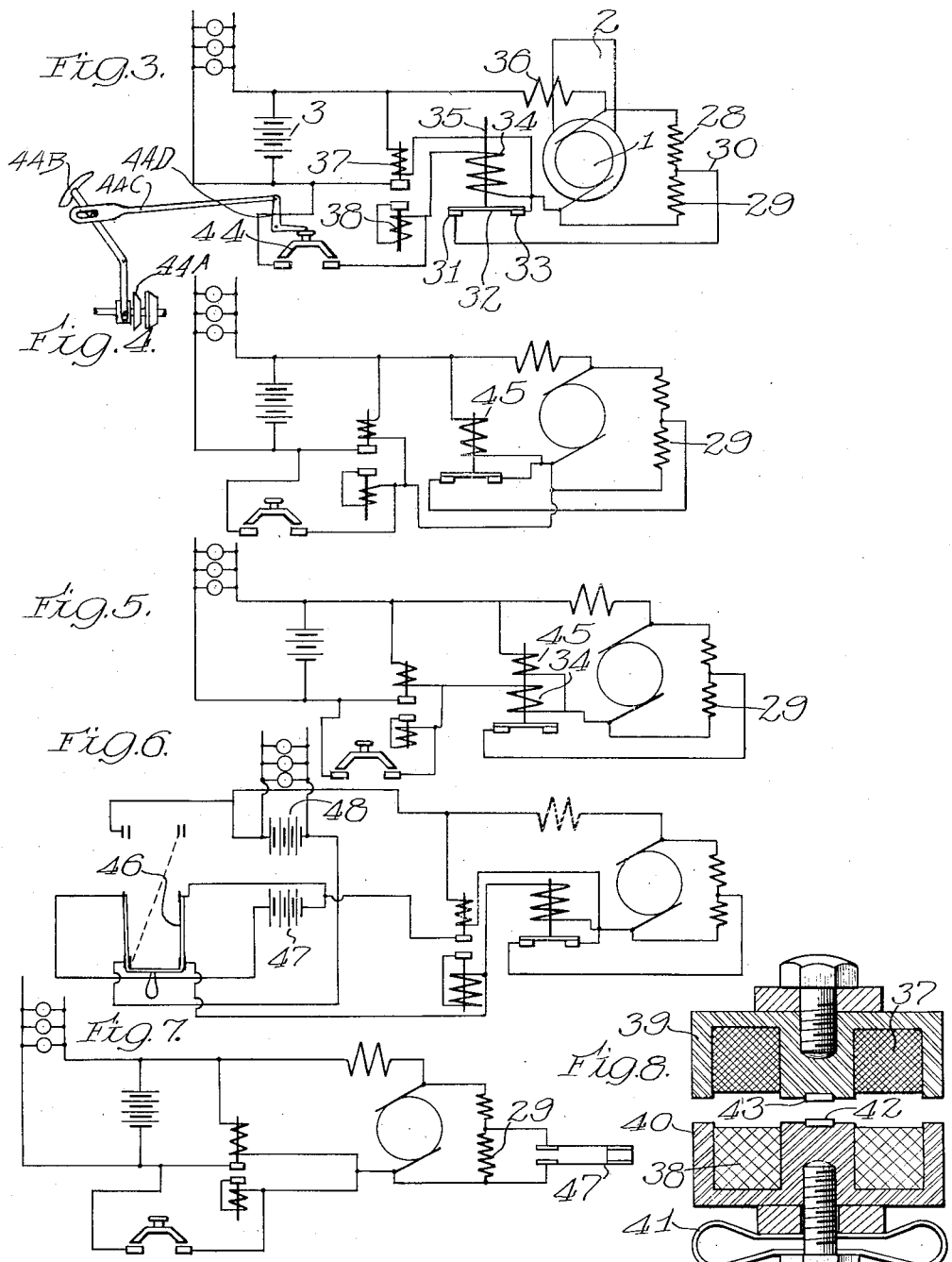

EDWARD L. JONES AND CHARLES H. ROTH, OF CHICAGO, ILLINOIS, ASSIGNORS TO JONES ELECTRIC STARTER CO., OF CHICAGO, ILLINOIS, A CORPORATION OF ILLINOIS.

ELECTRIC GENERATOR AND VEHICLE-STARTER.

1,087,950.  Specification of Letters Patent.  Patented Feb. 24, 1914.

Application filed December 26, 1911. Serial No. 667,958.

*To all whom it may concern:*

Be it known that we, EDWARD L. JONES and CHARLES H. ROTH, citizens of the United States of America, and residents of Chicago, county of Cook, State of Illinois, have invented certain new and useful Improvements in Electric Generators and Vehicle-Starters, of which the following is a specification.

This invention relates to power plants for motor vehicles and particularly those which include an internal combustion engine and electrical equipment.

The main objects of this invention are to provide improved means for connecting a dynamo-electric machine to a motor, and including gearing and automatic means for changing the ratio of said gearing; to provide improved means for regulating the output of the dynamo-electric machine; to provide an improved combination of dynamo-electric machine, engine and storage battery so arranged that the dynamo-electric machine is operated both as a generator and as a motor and is connected to the engine by means automatically providing a large gear ratio to obtain a large starting torque on the engine shaft, and automatically providing a direct drive from the engine to the dynamo-electric machine to furnish current; to provide an improved, simple and substantial ratchet locking mechanism which directly connects the dynamo-electric machine to the engine when the torque is supplied from the engine to the dynamo-electric machine, and which is loose when the torque is supplied to the engine by the dynamo-electric machine; to provide for this purpose an improved planetary gear which operates only in one direction, having ratchets adapted to set when the torque is supplied by the dynamo-electric machine, and to release when the torque is supplied by the engine; to provide an improved construction and arrangement of the parts whereby injury to the gearing through backfiring of the engine is prevented; and to provide automatic means for changing from one gear ratio to the other, said gear change being actuated by the relative torque and independently of speed. These objects are accomplished by the device shown in the accompanying drawings, which illustrate one specific embodiment of the mechanical features of this invention and several modifications of the electrical connections.

Figure 1 is a side elevation, partly sectional, of the transmission mechanism forming the connection between the engine and the dynamo-electric machine. Fig. 2 is a transverse section of the same on the line A—A of Fig. 1. Fig. 3 is a diagrammatic view illustrating the electrical circuits arranged to operate the dynamo-electric machine as a starting motor or as a battery charging constant current generator. Fig. 4 is a diagrammatic view of a similar system having the dynamo-electric machine arranged to operate as a constant voltage generator. Fig. 5 is a diagrammatic view of a similar system having the electrical connections arranged for operation of the dynamo-electric machine as a starting motor and battery charging generator with combined current and voltage regulation. Fig. 6 is a diagrammatic view of a similar system arranged for operation of the dynamo as a starting motor with two batteries in series, and as a charging generator for said batteries in parallel connection. Fig. 7 is a diagrammatic view of the electrical circuits arranged to operate the dynamo-electric machine as a starting motor and as a battery charging generator with the voltage or current regulated by mechanical means. Fig. 8 is a sectional view of the automatic switch used for opening and closing the circuits at predetermined current or voltage values.

In the form shown in the drawings, the apparatus is particularly designed for use on motor-propelled vehicles, and provides a dynamo-electric machine 1 connected with a driving machine or motor represented by the engine 2 of the vehicle in such manner as to charge the battery 3 when the engine is running between certain limits of speed and to operate as a motor to start said engine by utilizing energy supplied by the storage battery, which battery is also available for the usual electric service required on moving vehicles. As the electrical requirements in such a system demand but a small amount of power as compared with that used in the driving of the vehicle, it is important that the generator be as light as possible. In order that such a light generator, when operated as a motor, shall be able to start the comparatively powerful engine, there is interposed in the driving connection between the engine and the dynamo-electric machine a system of gearing controlled by the direction of the torque, so that when the engine is driving the dynamo-electric machine, the power may be transmitted direct, while, when the engine is driven by the dynamo-electric machine, as a starting, said mechanism will provide a large mechanical advantage.

In the form shown in Figs. 1 and 2, the driving connection between the engine and the dynamo-electric machine is made up as follows: The shaft 4 may be either the crank shaft of the engine or a drive shaft connected therewith, and the shaft 5, which is in axial alinement with the shaft 4, is the rotor shaft of the dynamo-electric machine. A compound ratchet clutch mechanism is interposed between the adjacent ends of the shafts 4 and 5 and comprises a ratchet member 6, concentrically arranged within a coacting member 7, the member 7 having an internal annular friction surface 8, coöperating with balls or rollers 9, which, in turn, ride on the inclined surfaces 10 of the ratchet member 6, and serve to lock the members 6 and 7 together against relative rotation when the torque is delivered by the shaft 4 and to release the member 7 when the torque is delivered by the shaft 5.

In order to provide the desired mechanical advantage for the dynamo-electric machine when it is operated as the starting device for the motor, there is also interposed between the shafts 4 and 5 a system of planetary gearing, which includes a gear 11 on the shaft 5 and a gear 12 on the shaft 4. The connection between the gears 11 and 12 is by means of the planetary gears 13 and 14, rigidly connected together by a shaft 15 journaled in the planetary gear race 16. There are two sets of planetary gears 13 and 14 so as to exactly balance the strain on the system. The gears 13 have a greater diameter than the gear 11 and the gear 12 has a greater diameter than the gears 14. The gear race 16 is surrounded by a casing section 17, which has its inner surface provided with ratchet shoulders 18 arranged to coact with pivoted pawls or dogs 19, carried by the race 16. These dogs are normally urged into position for engagement with the shoulders 18 to prevent rotation of the gear race 16 in the direction of the arrow 20 of Fig. 2. This insures that when the engine is driving the dynamo-electric machine, the gear race will rotate freely and render the planetary system inoperative for transmitting power, thus allowing the power to be transmitted directly from the shaft 4 to the shaft 5. When the gear race is rotated in this direction, the counterweights 21 cause the pawls 19 to be retracted against the action of the springs 22 and thus avoid the clicking of the ratchet, which would otherwise occur.

When the dynamo-electric machine drives the gear 11 the torque upon the gear race will be such as to drive it in the direction indicated by the arrow 20 of Fig. 2, and the dogs 19 will therefore lock and cause the power to be transmitted through the system of planetary gears, since the ratchet clutch members 6 and 7 will be released under similar torque conditions. The dynamo-electric machine will therefore have the mechanical advantage due to the system of planetary gears when it is used as a motor to start the engine. When the engine "back-fires" or oscillates, its torque reverses, and the clutch members 6 and 7 become engaged, and therefore sudden and excessive strains would, unless properly provided for, have to be resisted by the dogs 19 and the clutch members 6 and 7. For this reason the member 7 is connected to the shaft 4 by means of a friction clutch 23, which yields under a predetermined strain. In practice, the friction clutch 23 does not slip under the normal torque of direct driving of the dynamo-electric machine by the engine, because it is set by means of the spring 24 and adjusting screw 25 to yield at a torque approximately double the normal torque.

Fig. 3 shows an arrangement of the electrical circuits connecting the storage battery 2, the dynamo 1, and the automatic regulating device in which the essential feature is the shunt winding of the dynamo-electric machine, which consists of two coils 28 and 29, which are differentially connected. A conductor 30 is connected at the junction point of the coils 28 and 29. The conductor 30 is connected to the contact 31 and through the contact bar 32 to the contact 33, which is in turn connected to the opposite end of the differential coil 29. In Fig. 3, as shown, the differential coil 29 is short-circuited through the contact bar 32 and all of the magneto-motive force in the shunt circuit is supplied by the coil 28.

In the main line connecting the dynamo with the storage battery is a solenoid 34, which operates the plunger 35, which is in turn mechanically connected to the contact bar 32. In the event that the current through the solenoid 34 reaches any predetermined value, the contact bar 32 is lifted from the contacts 31 and 33, sending a current through the differential coil 29, thus reducing the magnetomotive force in the shunt circuit, and the current output of the dynamo 1 can be maintained at substantially a constant value owing to the intermittent action of the plunger 35, and the control of the current in the coil 29. An additional magnetomotive force may be supplied to the field circuit by a series coil 36. One of the important features of the control of the battery charging circuit is an automatic switch which is provided with both a shunt winding 37 and a series winding 38. In Fig. 3, the shunt winding 37 is connected across the power circuit at any convenient point, preferably outside the series field coil 36, and the winding is so proportioned that when the voltage reaches a predetermined value, the magnetism produced in the frame 39 will be sufficient to overcome the action of the spring 41 and lift the frame 40 which incloses the series coil 38. When the frame 40 is lifted, the circuit is closed between the contacts 42 and 43, closing the circuit between the dynamo-electric machine and the battery. This arrangement insures that the battery does not begin to charge until the voltage of the generator has reached the proper value in order to charge the storage battery 3. In case the current through the coil 38 reverses, it will demagnetize the frame 40, thus releasing the circuit. In case the battery 3 is to be used to operate the dynamo-electric machine as a motor, there is provided a manual switch 44, which is connected around the automatic switch and makes it possible to deliver the current from the battery to the dynamo-electric machine without passing through the automatic switch. The switch 44 is preferably interlocked with the main driving clutch 44$^A$ so as to prevent the switch 44 from being closed until the main clutch 44$^A$ is opened. This interlocking mechanism is indicated diagrammatically in Fig. 3 by clutch lever 44$^B$, link 44$^C$ and bell crank 44$^D$, one end of link 44$^C$ being slotted to permit the clutch to be operated independently of the switch. The switch may be closed by pushing the lever 44$^B$ an additional distance beyond its position for opening the clutch.

The arrangement of electric circuits as shown in Fig. 4, is in all respects similar to that shown in Fig. 3, with the exception that a solenoid 45 is connected in shunt across the line in such manner that the intermittent action on the field coil 29 is controlled directly by the voltage of the generator, the automatic switch being operatable as before described. Hence when the voltage rises to a predetermined point the solenoid 45, being bridged across the line, becomes sufficiently energized to open the shunt switch 32 and thereby cut in the differential coil 29 to reduce the voltage independently of the load current, the solenoid 45 again releasing and opening the switch 32 as soon as the voltage decreases to a certain degree.

The arrangement of the circuits, as shown in Fig. 5, will accomplish a regulation of the magnetomotive force in the field circuit through the action of the coil 29, which is controlled by the combined action of the coils 34 and 45, the coil 34 being connected in series, and the coil 45 being connected in shunt, the resultant action being the predetermined sum of the effects due to voltage and current. Hence, when the two energizing factors, generator voltage and load current combine to energize the solenoid 34—45 to a certain predetermined degree, its core will be drawn in and the switch 32 opened thereby, restoration occurring as soon as one or the other or both of said factors reduce sufficiently to deënergize the solenoid to a certain point at which it releases.

The arrangement of electric currents shown in Fig. 6 is similar to that shown in Fig. 3, with the exception of a double-pole, double-throw switch 46, which will charge the batteries 47 and 48 in multiple, and makes it possible to use the batteries 47 and 48 in series when the batteries are used as a source of energy for operating the dynamo-electric machine as a motor. The position of the switch 46, as shown in Fig. 6, is that in which the batteries are connected in series when they are used as a source of energy to operate the dynamo 1 as a motor. When two batteries and a double-pole, double-throw battery connecting switch are used, as shown in Fig. 6, the shunt switch 44 of Fig. 3 may be dispensed with, and the shunt around the automatic cut-off charging switch 37—38 may be connected through a pair of contacts of the said battery switch when the same is closed in its battery discharge position. By reversing the battery switch 46 the shunt around the switch 37—38 is opened and the batteries are reconnected from series discharge to parallel charge arrangement, and vice versa.

The arrangement of the electrical circuits shown in Fig. 7 is in all respects similar to that shown in Fig. 3, with the exception that the action of short-circuiting for the coil 29 may be controlled either by a hand operated jack 47 and plug 47′, or by an automatic interrupter arranged to be operated mechanically as by a centrifugal device on the engine shaft or the like.

In Fig. 7 the numeral 48 designates an extension of the shaft of the engine or preferably the generator; 49 a pair of insulated collector rings mounted on the said shaft; 50 a pair of brushes to bear upon said rings; 51 a rigid conductor mounted on the end of said shaft at one side and insulated therefrom; 52 a spring conductor mounted outside of the said rigid member 51 from the shaft 48 and insulated from both; 53 a weight attached rigidly to the tip of said spring to cause same to swing outwardly by centrifugal force when the shaft rotates; 54 an adjustable contact screw on the bar 51 with which the spring 52 is normally in contact when the apparatus is at rest or running below normal speed. The said brushes are connected to opposite ends of the differential coil 29. One of the rings 50 is connected to the bar 51 and the other to the spring 52. When the engine attains a certain predetermined speed, the voltage and current reach a maximum allowable point and are prevented from exceeding the predetermined limit by the opening of the speed controlled switch 52—54 whereby the said coil 29 is cut into the field circuit.

No attempt has been herein made to show or describe all possible modifications, and it will be readily seen that numerous details of the construction shown may be altered or omitted without departing from the spirit of this invention, as defined by the following claims.

We claim:

1. In a device of the class described, the combination of a pair of alined shafts, a system of planetary gearing connecting said shafts, a clutch device interposed between said shafts and comprising a pair of coaxial ratchet mechanisms, one of said ratchet mechanisms being adapted to lock said planetary gearing against rotation in one direction while permitting it to freely rotate in the opposite direction, and the other said ratchet mechanism being adapted to lock the shafts together when the torque transmitted between said shafts is in one direction, and to release them when the torque transmitted is in the opposite direction.

2. In a device of the class described, a pair of alined shafts and a variable speed transmission mechanism arranged to connect said shafts, said mechanism including a system of planetary gearing connecting said shafts to give a certain speed ratio, in combination with interposed clutch means comprising a pair of coaxial ratchet mechanisms, one of said ratchet mechanisms being adapted to lock said planetary gearing against rotation in one direction while permitting it to freely rotate in the opposite direction, and the other said ratchet mechanism being adapted to lock the shafts together when the torque transmitted between them is in one direction, and to release them when the torque transmitted is in the opposite direction.

3. In a variable speed transmission mechanism arranged for connecting a pair of alined shafts, a system of planetary gearing connecting the shafts, in combination with a clutch device interposed between said shafts and comprising a pair of coaxial ratchet mechanisms, one of said ratchet mechanisms being adapted to lock said planetary gearing against rotation in one direction while permitting it to freely rotate in the opposite direction, and the other said ratchet mechanism being adapted to lock one shaft to the other when the torque transmitted by the shafts is in one direction and to release it when the torque transmitted is in the opposite direction, all being arranged to make said planetary gearing inoperative and to lock the shafts one to the other in direct driving relation when the torque transmitted between the shafts is in one direction, and to cause said planetary gearing to be operatively interposed between the shafts when the torque transmitted is in the opposite direction.

4. In a device of the class described, a pair of machines, each adapted to drive the other, a clutch arranged to connect them directly when the torque of one machine predominates, and a planetary gear race and gearing operatively interposed between said machines in combination with a clutch controlling said planetary gearing and arranged to hold the gear race stationary when the torque of the other machine predominates, said clutches being arranged to operate automatically so that one is engaged and the other disengaged when one machine drives the other and vice versa.

5. In a device of the class described, a pair of machines, a gear casing and a changeable speed transmission mechanism housed within said casing and comprising a planetary gear race and gearing adapted to be interposed operatively between said machines for transmitting power from one machine to the other, and including a ratchet device adapted to render said planetary gearing operative for effecting a certain speed ratio when the speed of one machine predominates over that of the other, and to render said gearing inoperative when the speed of the other machine predominates, in combination with a second driving connection between said machines, also including a ratchet mechanism adapted to render said connection operative when the speed of said other machine predominates and the said gearing is inoperative, said gear race being journaled freely within the casing, and the first said ratchet when engaged being adapted to hold the gear race stationary.

6. In a device of the class described, a pair of alined shafts a system of symmetrically disposed planetary gearing arranged for connecting said shafts to provide a certain speed ratio therefor, in combination with a clutch device interposed between said shafts, in compact and substantially radial alinement with the planetary gears, and comprising a ratchet mechanism, including a pair of inner and outer members having ratchet relation with each other, one of said members having fixed driving relation to one of said shafts, and the other said member having yielding relation with the other said shaft.

7. In a device of the class described, the disposition in substantially radial alinement of transmission mechanism including two sets of connecting means of different speed ratios, automatic means connected with each said set respectively adapted to engage one of said sets of connecting means when the speed on one side predominates, and to release said connecting means and engage the other when the speed on the other side predominates, and yielding means interposed between the opposite sides and adapted to absorb shock.

8. In a variable speed transmission device of the character described, the combination of a hollow casing member of cylindrical shape having ratchet shoulders disposed about the peripheral inner surface thereof, a pair of alined shafts journaled in opposite sides of said casing respectively, and concentric therewith, planetary gearing interposed operatively between said shafts within said casing for producing a certain speed ratio when power is transmitted between the shafts in one direction, and a clutch adapted to connect said shafts directly when power is transmitted between the shafts in the opposite direction, said planetary gearing being disposed concentrically about the direct acting clutch, and including as an element a gear race journaled concentrically with said shafts, a ratchet dog carried by said gear race and arranged to act in a radially outward direction for engaging said ratchet shoulders on the casing to prevent rotation of said gear race when power is transmitted through the planetary gearing.

9. In a device of the class described, a stationary housing having a peripheral series of ratchet shoulders disposed about its inner surface, and a compound ratchet clutch mechanism therein, comprising a pair of concentrically disposed wedging clutch members adapted for direct connection, with resilient means for adjusting the clutch pressure, and planetary gearing, including a gear race journaled concentrically with the first said clutch members within the housing, and a ratchet dog pivotally mounted on the radial outer portion of said gear race for engagement with said ratchet shoulders when power is transmitted in one direction, means normally holding said dog in position to engage said shoulders, said dog being formed and arranged to be thrown out of engagement with said ratchet shoulders by centrifugal force when power is transmitted in the opposite direction and when the gear race is revolved at or above a predetermined speed.

Signed at Chicago this 21st day of December 1911.

EDWARD L. JONES.
CHARLES H. ROTH.

Witnesses:
  PHIL B. WOODWORTH,
  EUGENE A. RUMMLER.